(12) United States Patent
Wane et al.

(10) Patent No.: US 8,046,257 B2
(45) Date of Patent: Oct. 25, 2011

(54) SYSTEM AND METHOD FOR DISTRIBUTION, REDEMPTION AND PROCESSING OF ELECTRONIC COUPONS

(75) Inventors: Ismaila Wane, Tucson, AZ (US); Karsten Ohme, Dresden, DE (US)

(73) Assignee: Contactless Data, Inc., Tucson, AZ (US)

( * ) Notice: Subject to any disclaimer, the term of this patent is extended or adjusted under 35 U.S.C. 154(b) by 203 days.

(21) Appl. No.: 12/325,730

(22) Filed: Dec. 1, 2008

(65) Prior Publication Data
US 2009/0144164 A1    Jun. 4, 2009

Related U.S. Application Data

(60) Provisional application No. 60/991,729, filed on Dec. 2, 2007.

(51) Int. Cl.
*G06Q 30/00* (2006.01)
*G06Q 20/00* (2006.01)

(52) U.S. Cl. ................. 705/14.38; 705/14.1; 705/14.22; 705/17

(58) Field of Classification Search .................... None
See application file for complete search history.

(56) References Cited

U.S. PATENT DOCUMENTS

| | | | |
|---|---|---|---|
| 5,727,153 | A | 3/1998 | Powell |
| 5,832,458 | A | 11/1998 | Jones |
| 5,855,007 | A | 12/1998 | Jovicic et al. |
| 6,328,339 | B2 | 12/2001 | Dixon, III et al. |
| 6,741,968 | B2 | 5/2004 | Jacoves et al. |
| 6,766,301 | B1 | 7/2004 | Daniel et al. |
| 7,013,286 | B1 * | 3/2006 | Aggarwal et al. .......... 705/14.26 |
| 2004/0128197 | A1 | 7/2004 | Bam et al. |
| 2006/0293959 | A1 | 12/2006 | Hogan |
| 2007/0150339 | A1 | 6/2007 | Retter et al. |
| 2007/0174259 | A1 * | 7/2007 | Amjadi .............................. 707/3 |
| 2007/0185785 | A1 * | 8/2007 | Carlson et al. .................. 705/27 |
| 2008/0167991 | A1 * | 7/2008 | Carlson et al. .................. 705/50 |

(Continued)

FOREIGN PATENT DOCUMENTS

WO    0042583 A1    7/2000

OTHER PUBLICATIONS

Aigner et al., "A System of Secure Virtual Coupons Using FNC Technology", pp. 1-5, IEEE, 2007.

(Continued)

*Primary Examiner* — Faris Almatrahi
(74) *Attorney, Agent, or Firm* — Quarles & Brady LLP

(57) ABSTRACT

In a method of executing a transaction using an electronic coupon, coupon campaign information is provided to an engine. The coupon campaign information defines a discount value, a product family and a number of coupons to be distributed. Each coupon within the coupon campaign has a coupon identification (ID). Coupon publications are provided including a machine-readable portion that encodes coupon data describing the coupon campaign information. The coupon data is retrieved from the machine-readable portion of the coupon publication using a personal electronic device. The coupon data is used to retrieve a coupon ID that is stored in the personal electronic device. The coupon ID is transmitted to a point of sale (POS) system using the personal electronic device. The POS system communicates with the engine to verify a validity of the coupon ID. A discount is applied to a transaction in accordance with the discount value.

11 Claims, 8 Drawing Sheets

U.S. PATENT DOCUMENTS

2008/0228566 A1    9/2008    Williams et al.

OTHER PUBLICATIONS http://www.zixxo.com (Dec. 5, 2006).
http://www.milwaukeeworld.com/blog/2007/03/terror-link-to-coupon-fraud.html (Mar. 2007).
http://www.fas.org/irp/congress/1998_hr/s980224j.htm (1998).
http://www.crimetalkamerica.com/2007/04/ios-fraud-any-connection-to-funding.html (Apr. 30, 2007).
http://www.cellfire.com/about-us/environment.php (2007).
http://www.barcode-us.com/support_desk/valuetable.htm (Oct. 20, 2002).
http://www.scanaps.com (2007).

* cited by examiner

| EPC VERSION (8 BITS) | MANUFACTURER ID (28 BITS) | PRODUCT ID (24 BITS) | ITEM SERIAL NUMBER (36 BITS) |
|---|---|---|---|
| 01 | 0000A89 | 080160 | 000169DC0 |

PRODUCT ID (24 BITS)

| 080 | 16 | 0 |
|---|---|---|
| FAMILY CODE | VALUE CODE | RESERVED FOR FUTURE USE |

ITEM SERIAL NUMBER (36 BITS)

| 000169DC0 |
|---|
| ENCRYPTED NUMBER WITH dK |

```
TX-START
    <! Cashier scans products.... >
    <! Consumer waves phone over point of sale (POS) terminal
for coupon transfer>
        <! Coupon Information. . . >
            SELECT COUPON MANAGER APPLICATIONS
            READ SIGNED COUPON IDS
        <! Total discount is displayed to consumer>
        <! Consumer taps phone to POS for payment>
        <! Payment Card Information. . . >
            SELECT PROXIMITY PAYMENT SYSTEM ENVIRONMENT (PPSE)
DIRECTORY
            READ PPSE RECORDS
            SELECT DEFAULT PAYMENT APPLICATION
            RETRIEVE PAYMENT APPLICATION INFORMATION
        <! Network Connection...>
            POS sends product, payment and coupon info to COUPON
PROCESSING SYSTEM (CPS)
            CPS sends product and coupon info to COUPON ISSUANCE
SYSTEM (CIS) for validity check
            CIS validates coupons and returns list of valid coupons
            CPS computes total valid coupon values
            CPS subtracts from total product price
            CPS routes payment card info with subtracted amount to
Payment Card Network (e.g. VisaNet)
            If payment transaction approved:
                CPS requests to CIS to clear and settle coupon
redemption transaction
                CPS retrieves financial settlement info from CIS
                CPS deposits funds into acquiring bank with consumer
and CIS payment info.  (This could also be postponed for
later settlement in batch mode)
                Return transaction receipt to POS including
authorization codes.
            Else
                Return denied transaction code.  (Coupons are not
redeemed until the payment transaction is authorized)
TX-END
```

*FIG. 11*

SYSTEM AND METHOD FOR DISTRIBUTION, REDEMPTION AND PROCESSING OF ELECTRONIC COUPONS

CLAIM TO DOMESTIC PRIORITY

The present non-provisional patent application claims priority to Provisional Application No. 60/991,729 entitled "System and Method for Secure Real-Time Mobile Coupon Processing," filed on Dec. 2, 2007.

FIELD OF THE INVENTION

The present invention relates in general to a telecommunication system for electronic couponing and, more particularly to a system and method for issuing coupons and performing clearance and settlement of redeemed coupons.

BACKGROUND OF THE INVENTION

The coupon industry is a multi-billion dollar business generating significant savings for customers and allowing companies to compete in new markets, sell new products, and strengthen customer relations. In the US, over $331 billion worth of savings in paper coupons are in circulation each year. Even though the coupon industry offers many opportunities for savings for customers, many coupons go unredeemed. In fact, the coupon industry faces a very low redemption rate that is close to 1% for 300 billion issued coupons.

Unfortunately, the coupon industry suffers from a significant volume of fraudulent activities including duplication of coupons, alteration of coupons, or retailer fraud in the form of coupons that are redeemed for transactions that never take place. In some estimates, these fraudulent activities cost the couponing industry between $500 million and $800 million annually. In some cases, the fraudulent activity has been linked to the financing of terrorist activities with annual amounts of over $150 million.

Unlike the payment industry, the distribution, redemption and processing technologies used in the coupon industry are somewhat antiquated. Many coupons are issued as paper, which remains the principal distribution channel for coupon campaigns. Existing paper processing methods are very laborious and extremely time consuming with potential misredemptions and chargebacks for the retailers.

SUMMARY OF THE INVENTION

In one embodiment, the present invention is a computer-implemented method of executing a transaction using an electronic coupon comprising providing coupon campaign information to an engine. The coupon campaign information defines a discount value, a product family and a number of coupons to be distributed. Each coupon within the coupon campaign has a coupon identification (ID). The computer-implemented method includes providing coupon publications including a machine-readable portion. The machine-readable portion encodes coupon data describing the coupon campaign information. The computer-implemented method includes retrieving the coupon data from the machine-readable portion of the coupon publication using a personal electronic device, and using the coupon data to retrieve a coupon ID from the engine. The coupon ID is stored in the personal electronic device. The computer-implemented method includes transmitting the coupon ID to a point of sale (POS) system using the personal electronic device. The POS system communicates with the engine to verify a validity of the coupon ID. The computer-implemented method includes applying a discount to a transaction in accordance with the discount value.

In another embodiment, the present invention is a method of executing a transaction using an electronic coupon comprising providing coupon campaign information to an engine. The coupon campaign information defines a discount value, and a product family. Each coupon within the coupon campaign has a coupon identification (ID). The method includes communicating with the engine using a personal electronic device to execute a coupon search, and selecting a coupon from a list of search results generated by the coupon search to retrieve coupon data from the engine. The coupon data includes a coupon ID and is stored in the personal electronic device. The method includes transmitting the coupon data to a point of sale (POS) system using the personal electronic device, and applying a discount to a transaction in accordance with the discount value. The transaction is for goods or services.

In another embodiment, the present invention is a system for executing a transaction using an electronic coupon comprising a personal electronic device for retrieving coupon data from a machine-readable portion of a coupon publication. The machine-readable portion of the coupon publication encodes coupon data describing coupon campaign information. The coupon campaign information defines a discount value, and a product family. Each coupon within the coupon campaign has a coupon identification (ID). The system includes a point of sale (POS) system for retrieving the coupon data from the personal electronic device. The POS system is configured to communicate with an engine to verify a validity of the coupon data and to apply a discount to a transaction in accordance with the discount value.

In another embodiment, the present invention is a computer program product usable with a programmable computer processor having a computer readable program code embodied therein comprising computer readable program code which retrieves coupon data from a machine-readable portion of a coupon publication. The machine-readable portion of the coupon publication encodes coupon data describing coupon campaign information. The coupon campaign information defines a discount value, and a product family. Each coupon within the coupon campaign has a coupon identification (ID). The product includes computer readable program code which communicates with an engine to verify a validity of the coupon data, and computer readable program code which applies a discount to a transaction in accordance with the discount value.

BRIEF DESCRIPTION OF THE DRAWINGS

FIG. 11 illustrates pseudo-code providing an alternative process for retrieving and redeeming coupons using the present system.

DETAILED DESCRIPTION OF THE DRAWINGS

Figure 1:
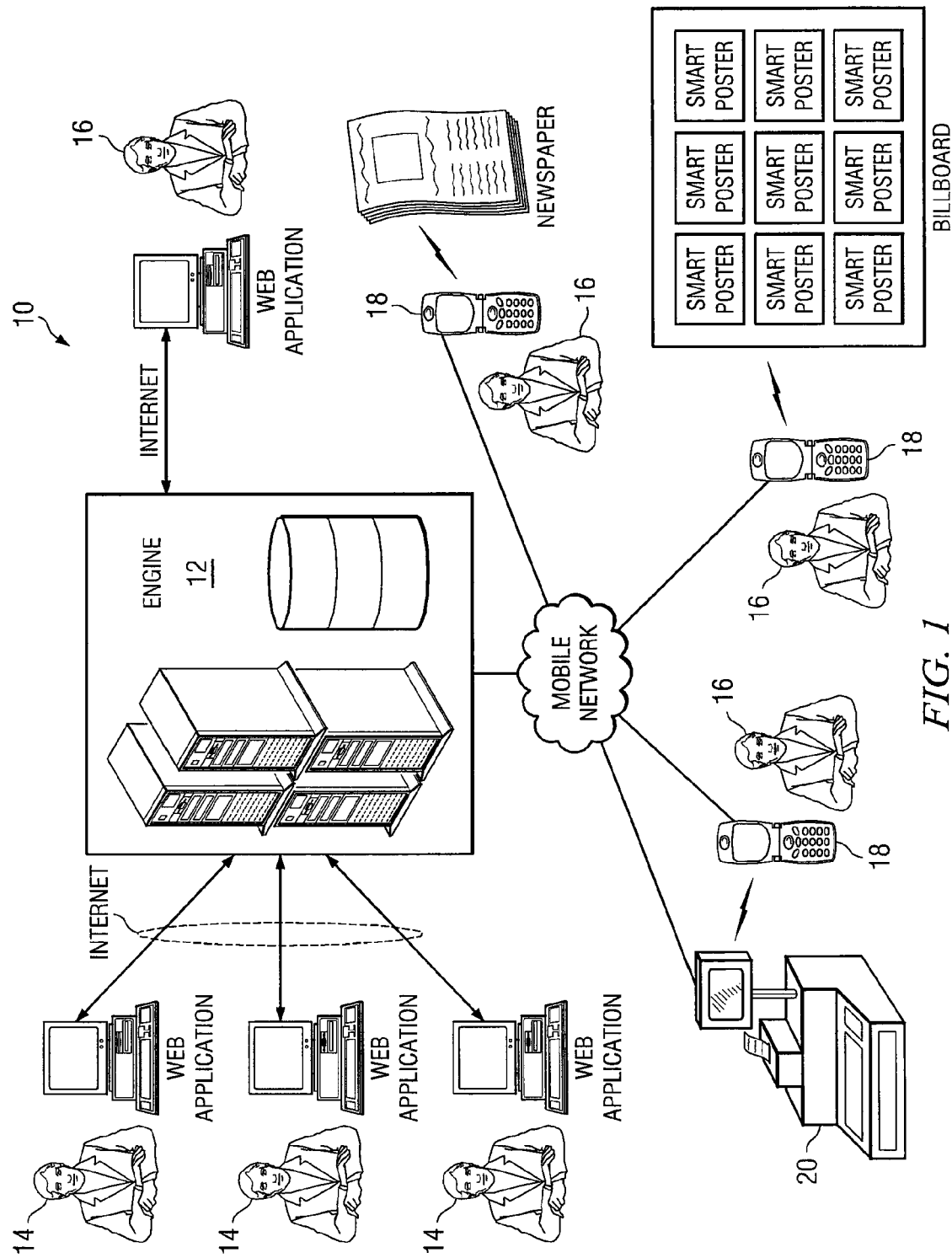
FIG. 1 illustrates an example coupon distribution and processing system for issuing coupons and performing clearance and settlement of redeemed coupons.

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Coupons provide a convenient mechanism for retailers or service providers to boost volume of sales or expand into new markets. The coupons may be distributed through many channels and allow retailers, manufacturers, service providers and other merchants to entice potential new customers to purchase a particular product, or to strengthen the loyalty of existing customers.

When introducing a new product or entering a new market, the merchant may use a coupon campaign to provide incentives for new customers to try the retailer's products. Depending upon the campaign, the coupons can generate substantial customer excitement about a new product, or generate strong bonds between the merchants and their customers. In some cases, when the coupons provide sufficient discounts, the coupons may even serve to create a "buzz" about the product that enhances the retailer's existing advertising efforts. Sometimes, the buzz generated by a coupon campaign is sufficient to diminish the need for additional advertising entirely. In other words, the coupon campaign can become an advertising campaign by itself.

With these beneficial effects, a coupon campaign can provide many benefits to a retailer. For example, coupons can be used when introducing a brand new product into a market. In the market, some customers may be unwilling to purchase the new product because they prefer other older and well-known or established brands. Or perhaps the new product is so different from other pre-existing products that the customers are not sure whether it will meet their needs. By issuing coupons for the new product, customers will take advantage of the discounts provided by the coupon and buy the new product. After trying the product, a number of the customers will discover benefits that the product provides over the other products in the same market. Even after the coupon campaign ends, those customers will continue to buy the product and have loyalty to the merchant.

Coupons directed at a particular product may also be used by a retailer to strengthen the sales of other products. A grocery, for example, may offer coupons providing substantial discounts for one category of products in order to sell more products belonging to other, complementary product categories. For example, by issuing coupons for chips, a grocery may strengthen the sales of salsas and dips, or other products that complement or are used with the chips.

Accordingly, coupon campaigns can provide retailers strategic advantage over competitors in the same market space. Even though the coupons may provide customers with a substantial discount to the product price (resulting in decreased revenue for the retailer), the coupons provide additional advantages that can strengthen the retailer's position in the marketplace.

In many cases, coupons are distributed by manufacturers of a product rather than the retailers. For example, a company that produces sodas may start a coupon campaign that provides discounts for their products. Those coupons are redeemed at any retailer that sells the manufacturer's products. When a manufacturer issues the coupon campaign, a clearing and settlement process or other processing must take place after a coupon is redeemed to ensure that the retailer is compensated for the discount provided by the coupon. This process requires the transfer of funds from the manufacturer to the retailer to compensate the retailer for the discounts extended to customers using the coupon. Depending upon the value of each coupon and the volume of sales, this payment may be substantial.

Even though coupon campaigns allow a retailer to generate a strategic advantage over competitors, existing coupon systems are complex and difficult to use. Paper coupons, for example, are costly to prepare and distribute and are subject to duplication—a serious problem if the coupon provides substantial cost savings. In many cases, the costs of implementing copy-prevention schemes within the coupons (including watermarks and unique IDs) is substantial and results in inefficiencies minimizing the value of the campaign.

Paper coupon systems are also difficult to use when performing clearing and settlement activities to transfer funds between manufacturers and retailers. In situations where the coupon is distributed by a manufacturer rather than the retailer, a complex clearing and settlement process must take place to ensure that the retailer is compensated by the manufacturer for the value of the coupon. This process may require a visual review of all paper coupons accepted by the retailer and a review of the sales logs of the retailer.

In order to minimize the costs associated with printing and distributing coupons, some manufacturers elect to publish their coupons over the Internet, or some other electronic distribution medium. Although the costs of printing the coupons are shifted to the customers, coupon campaigns distributed over the Internet suffer from the same duplication problems of paper coupons—the coupons can be printed many times and repeatedly used by customers. Accordingly, most Internet-based coupon campaigns must rely upon limited coupon lifetimes to prevent customers printing and using so many coupons that the campaign becomes disadvantageous. These temporal limitations make the coupons less attractive to customers and less likely to be used. Furthermore, because the coupons can be freely duplicated and their use is only limited by an expiration date, it is difficult to capture useful data during the campaign to evaluate the campaign's efficiency and to capture metrics about the customers using the coupons.

The present system provides a mechanism for electronically distributing coupons to customers. The system allows for secure, real-time automated processing of coupons and may be configured to use electronic data transferring technologies including near-field communication (NFC) technology. The system operates at a merchant's points of sale and may be used to prevent coupon fraud and reduce inefficiencies caused by traditional coupon processing (including both paper-based coupons and other electronically distributed coupon systems). The system allows for both offline and online coupon transactions, while maintaining records to allow for accurate clearing and settlement processes and the generation of metrics for improved merchant business plans or competitive strategies. In the system, each coupon is assigned a unique coupon ID, allowing the merchant to limit the total number of issued coupons and to track how the coupons are used by the customers. An optional encryption mechanism may be used to obfuscate the coupon IDs to prevent their duplication and to prevent users from creating counterfeit coupons with fake coupon IDs.

FIG. 1 illustrates example coupon distribution and processing system 10. System 10 includes engine 12. Engine 12 includes one or more computer servers that manage both the distribution, redemption and processing (including clearing and settlement) of coupons. Engine 12 may be implemented by a single server or a collection of servers providing both functions. In other embodiments, the coupon distribution and redemption and processing functions of engine 12 may be performed by separate servers or collections of servers that can be operated by separate entities.

In one embodiment, engine 12 is a centralized system connected to a computer network and provides both a coupon issuance system (CIS) and a coupon processing system (CPS). The CIS manages the creation and distribution of coupons, while the CPS manages the clearing and settlement process used to redeem and process coupons and, if necessary, to transfer funds between manufacturers and retailers. Engine 12 is also configured to allow for the management of the CIS and CPS by different entities. In alternative embodiments, engine 12 may include JAVA EE or C++ applications with a distributed architecture.

Figure 12:
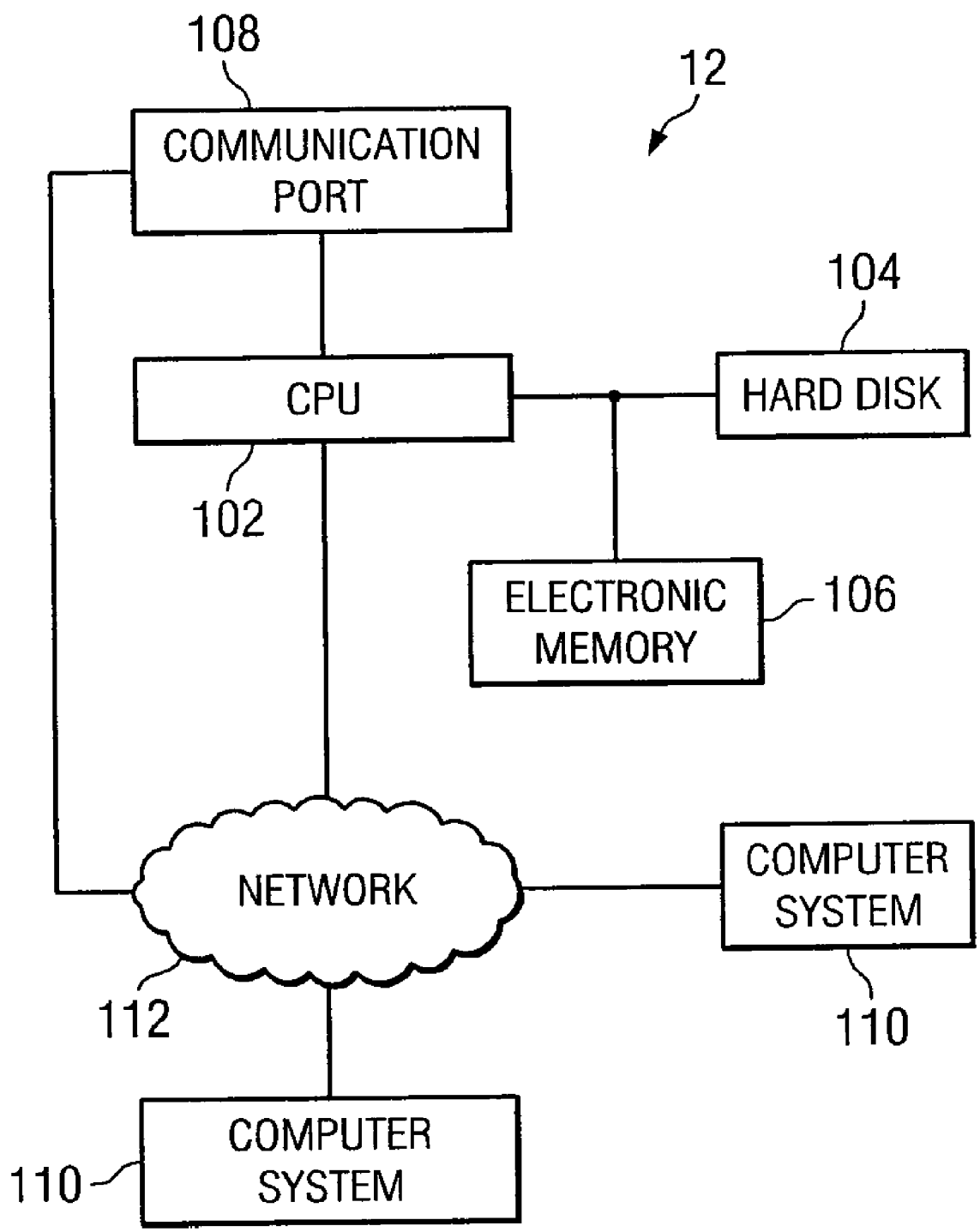
FIG. 12 illustrates a computer system and network for operating the engine of the present coupon distribution, redemption and processing system.

In one example configuration of engine 12, as shown on FIG. 12, engine 12 is a general purpose computer or collection of computers including central processing units 102, mass storage devices or hard disks 104, electronic memories 106, and communication ports 108. The communication ports may include modems, high-speed Ethernet links, or other electronic connection mechanisms to transmit and receive input/output (I/O) data with respect to other computer systems.

Engine 12 connects to other components or computer systems 110 of system 10 using communication port 108, which in turn is connected to communication network 112. Using communication network 112, engine 12 provides a user interface for transmitting and receiving data. Communication network 112 can be a local and secure communication network such as an Ethernet network, global secure network, or an open architecture network such as the Internet.

Engine 12 runs application software and computer programs to display user interface screens for receiving coupon campaign information, execute the system functionality, and provide the features of system 10. In one embodiment, the screens and functionality come from locally-running application software, i.e., the system software runs directly on one of the computer systems in engine 12. The various websites of system 10 are generally restricted access and require passwords or other authorization for accessibility. Communications through the website may be encrypted using secure encryption algorithms. Alternatively, system 10 is accessible only on a secure private network, such as a Virtual Private Network (VPN), with proper authorization.

The software for providing the system functionality is originally provided on computer readable media, such as compact disks (CDs), magnetic tape, flash memory drives, or other mass storage medium. Alternatively, the software is downloaded from remote storage systems such as a host or vendor website. The software is installed onto hard drive system 104 of engine 12 or other electronic memory 106, and is accessed and controlled by the computer's operating system. Software updates are also electronically available on mass storage medium or downloadable from the host or vendor website. The software, as provided on the computer readable media or downloaded from electronic links, represents a computer program product usable with a programmable computer processor having a computer readable program code embodied therein. The software contains one or more programming modules, subroutines, computer links, and compilations of executable code which perform the functions of the system. The user interacts with the software via keyboard, mouse, voice recognition, and other user interface devices connected to the computer system.

In the case of Internet-based websites, the interface screens are implemented as one or more web pages for receiving, viewing, and transmitting information related to the system. Depending upon the system configuration, a host service provider may set up and administer the website.

Returning to FIG. 1, merchants 14 communicate with engine 12 to submit the details or rules for a coupon campaign to the CIS of engine 12. Merchants 14 may include any business or private entity including retailers, distributors, manufacturers, individual users, or any other entity involved with the distribution, sale or advertising of goods or services. In one embodiment, merchants 14 communicate with engine 12 using a web-page, or other Internet-based communication interface. However, in other embodiments, merchants 14 communicate with engine 12 using emails, web services (including simple object access protocol), letters, telephone, cell phones, text messages, or any other communication mechanism or interface.

A coupon issuer ID may be used as an identifier or primary key to identify merchants 14 in a database and to allow merchants 14 access to their accounts maintained in engine 12. The account information for merchants 14 may include the merchant's bank identification number (BIN), international bank account number (IBAN), society for worldwide interbank financial telecommunication (SWIFT) code or any other information used in an electronic financial transaction involving the merchant.

To initiate a coupon campaign, one of merchants 14 provides engine 12 with information defining how the campaign will operate. Depending upon the merchant's requirements for the campaign, merchant 14 may provide a campaign start and end date, a maximum number of coupons to issue in the campaign, a product family to which the coupon relates, and a discount amount that indicates the actual discount value of the coupon. The discount amount may be a simple dollar amount (e.g., "$1 off all products in this product family"), or it may include a formula or algorithm. For example, the discount amount may be "buy one, get one free", "get 2 free if the total purchase amount is over a pre-determined value" or "save $10 on product A if product B is also purchased."

Additional information relevant to the campaign includes a campaign name and related graphics or images, a limitation on the number of coupons to be issued to customers in particular states, cities or locations, a maximum number of coupons to be used by a single customer, or any other information that can be used by engine 12 to control how the coupon campaign operates. Having created the campaign, the coupons are distributed to customers 16 using an appropriate mechanism.

As shown on FIG. 1, customer 16 can retrieve coupons directly from engine 12 over the Internet using a web application interface. For example, engine 12 may provide a search engine that allows customer 16 to search for and retrieve coupons for products. In one embodiment, customer 16 searches for coupons using cell phone 18. After finding the desired coupon, customer 16 initiates retrieval of the coupon from engine 12 and the coupon data is loaded into cell phone 18.

In other embodiments, customer 16 uses a cell phone, personal digital assistant (PDA), or other personal electronic device for retrieving coupons from other sources. For example, coupon data may be read from and loaded into cell phone 18 directly from newspapers, magazines, billboards, web-based content, television advertisements or other publications or broadcast media. For example, based upon the campaign information, various advertisements or publications are prepared that advertise the existence of the coupon campaign and provide information describing the discounted product to customers. The publications may include written descriptions, text, graphics, or animations to entice the customer and advertise the benefits of the product. The publication also includes a machine-readable section which encodes specific coupon data that can be accessed by an electronic device for the purposes of loading the coupon into the electronic device.

If customer 16 views a coupon publication and wishes to use the coupon described therein, the encoded coupon data is scanned from the machine-readable portion of the publication and incorporated into cell phone 18. Cell phone 18 uses any appropriate technique for scanning the encoded coupon data from the publication or advertisement. For example, cell phone 18 may take a picture of the publication (for example, from a newspaper, billboard or poster) and use optical character recognition (OCR) to retrieve text from the publication. After retrieving the text, cell phone 18 analyzes the text to determine the specific details for the coupon. Alternatively, the printed coupon information may include a 1D or 2D bar code that encodes information identifying the coupon. If a bar code is present, cell phone 18 is used to scan an image of the bar code, which is analyzed to determine the coupon data. Cell phone 18 then uses the coupon data to communicate with engine 12 to retrieve all coupon details and to load the coupon into cell phone 18. In one embodiment, the publication includes radio-frequency ID (RFID) tags that communicate with cell phone 18 and transmit coupon data to cell phone 18 wirelessly. Alternatively, the publication may include a printed serial or ID number identifying either a coupon campaign or a specific coupon within the campaign which can be entered into cell phone 18 by customer 16 and used to load the coupon data. Any information may be encoded within the publication to identify the coupon campaign. For example, the bar code or RFID tag may encode a coupon campaign identifier, an Internet protocol (IP) address, uniform resource locator (URL) or other contact information for engine 12, coupon family ID, product ID, or a specific coupon ID.

After scanning the coupon data from the machine-readable portion of the publication, cell phone 18 communicates with engine 12 to determine whether the coupon is valid and to retrieve any additional coupon data necessary for the customer to redeem the coupon. For example, if the number of coupons to be issued by a particular campaign is limited, cell phone 18 communicates with engine 12 to determine whether any valid coupons are still available. Similarly, if the coupon is limited to a particular date range or location, cell phone 18 communicates with engine 12 to determine whether the coupon is still valid and whether the location of customer 14 satisfies the campaign's requirements.

Upon determining that a valid coupon is available, cell phone 18 communicates with engine 12 to retrieve a coupon ID, product family ID and a discount amount for a specific coupon within the coupon campaign. The coupon ID identifies the specific coupon within the campaign of merchant 14 that was retrieved by customer 16. For security reasons, the coupon ID or other coupon data may be encrypted with a key known to CIS 34. The product family ID in the coupon data identifies which products are covered by the coupon and the discount amount indicates the value of the coupon. At this time, engine 12 notes that a coupon having the coupon ID has been downloaded, and does not allow any additional downloads of that particular coupon ID. In an alternative embodiment, however, all the coupon data necessary to use the coupon (including a specific coupon ID) may be encoded within the publication so no communication with engine 12 is necessary.

Having retrieved the coupon data from system 10, customer 16 interacts with POS system 20 to make purchases and redeem the coupons. For example, customer 16 may select several items for purchase at a particular store. Upon checking-out, POS system 20 scans all of the products to be purchased by customer 16. After scanning the items, POS system 20 interacts with cell phone 18 of customer 16 to retrieve any relevant coupons stored on the device. In one embodiment, POS system 20 retrieves all available valid or activated coupons from cell phone 18. After retrieving the coupons, POS system 20 analyzes the family ID of each coupon to see if it matches that of any of the products to be purchased by customer 16. If any of the family IDs match, POS system 20 applies the discount specified by the coupon for that product and presents customer 16 with a total discounted transaction amount and customer 16 can begin the payment process. In this embodiment, POS system 20 may include various computer of electronic network components for executing transaction and communicating with other components of the present system using the electronic network.

Before payment is complete, however, POS system 20 communicates with the CPS portion of engine 12 to process the coupons and ensure the coupons are valid. Depending upon the system configuration, POS system 20 may communicate with engine 12 using a wired or wireless connection. For example, POS system 20 may communicate via the Internet, or a wireless cell phone network. To process a coupon, POS system 20 transmits the coupon ID of all coupons used by customer 16 to engine 12. The CPS within engine 12 receives the coupon IDs from POS system 20 and communicates with the CIS of engine 12 to verify that the coupons are valid and active. If so, engine 12 transmits a message to POS system 20 indicating that the coupons are valid. If the coupons are valid, POS system 20 proceeds with the transaction and charges customer 16 the discounted amount.

After processing a coupon, the CIS portion of engine 12 creates a record that a coupon having the coupon ID received from POS system 20 has been used. Accordingly, that coupon ID is no longer valid and its coupon ID will not be issued again.

Figure 2:
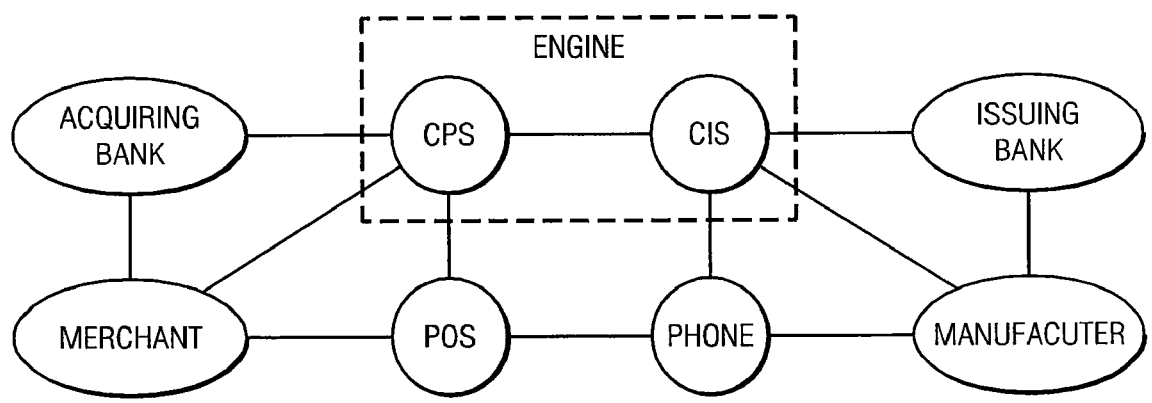
FIG. 2 illustrates a network for distributing, redeeming and processing coupons wherein the coupon is issued by a manufacturer, and the coupon discount is given by a separate retailer.

The CPS portion of engine 12 also processes the coupon to determine whether any payments must be made between merchants. FIG. 2 illustrates a network for distributing, redeeming and processing coupons wherein the coupon is issued by a manufacturer, and the coupon discount is given by a separate retailer. As a result, a payment must be made from the manufacturer of the goods to the retailer to compensate the retailer for the cost of the discount provided by the coupon. To compensate the retailer for the value of the discount, the CPS initiates a payment between the issuing bank for the manufacturer and the acquiring bank for the retailer.

Figure 3:
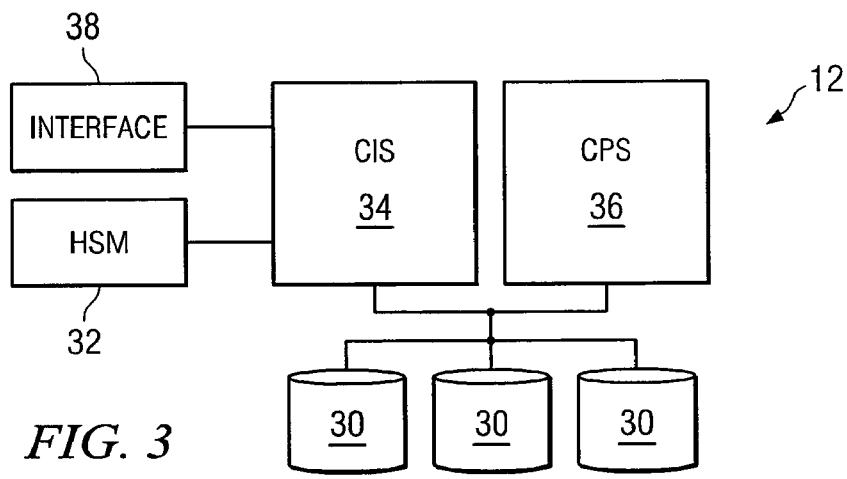
FIG. 3 illustrates additional details of an engine included within a network for managing a coupon distribution, redemption and processing system.

FIG. 3 illustrates additional details of engine 12 for managing the coupon distribution, redemption and processing system 10. Engine 12 includes database structure 30 that allows for secure or encrypted storage of coupon data, customer data, or other financial data used by engine 12. In one embodiment, engine 12 has access to several secure databases, each database is encrypted with one or more encryption keys. Database 30 on engine 12 provides secure storage of data including coupon IDs, phone IDs, issuer IDs, POS IDs, encryption keys, and other data used by engine 12. For data management purposes and to enhance the security of the databases on engine 12, engine 12 may also include a key management system having master keys stored in hardware security module (HSM) 32. The master keys are stored only in the hardware, never leave HSM 32, and are used to generate essentially random encryption keys that may be used within system 10 to secure databases 30 and the data stored therein.

Engine 12 includes both CIS 34 and CPS 36. CIS 34 manages the creation and distribution of coupons and is configured to communicate with both databases 30 and HSM 32. CPS 36 manages the clearing and settlement process used to redeem and process coupons and, if necessary, to transfer funds between manufacturers and retailers or other entities. CIS 34 and CPS 36 may be operated by the same entity using the same group of computer servers. However, in some embodiments, CIS 34 and CPS 36 are operated by separate entities using separate collections of computer servers in different locations.

Engine 12 receives details of the coupon campaign using interface 38 which may include a web page, email system, or other interface for receiving campaign information from merchant 14. After receiving the campaign information from merchant 14 via communication interface 38, engine 12 initiates the campaign by creating entries in database 30 for each of the coupons to be issued as part of the campaign. In one example, a coupon campaign authorizes the issuance of 1,000,000 coupons for a particular product. In that case, after receiving the campaign information, engine 12 creates 1,000,000 entries in database 30 for each coupon. Each database entry is used to determine whether that particular coupon has been activated or redeemed, and stores a unique ID number or token identifying the coupon manager (and thereby the customer) used to activate and redeem the coupon. Depending upon the details of the coupon campaign, database 30 may also contain data describing the duration of the campaign, the number of coupons to be issued and their discount values, the product family that the coupons apply to, whether a particular coupon has been retrieved by a customer and whether the coupon has been redeemed by the customer. Additional information stored within database 30 or on engine 12 may include any graphics, or advertising material associated with the campaign, a listing of locations in which the coupons may be used, categories of customers that may use the coupons, a listing of stores in which the coupons may be redeemed, the name of the entity issuing the campaign, or other coupon campaign details. Each coupon within a particular coupon campaign is identified within database 30 by a unique coupon ID. When the coupon entries are generated, the coupon IDs may be encrypted in database 30 using an encryption key stored in HSM 32 or otherwise available to CIS 34 of engine 12.

Having defined the coupon campaign and prepared entries in database 30 for each of the coupons, details about the coupon campaign may be published or otherwise distributed so that customers can begin retrieving the coupons and using them to purchase products or services.

In order to advertise and make the coupon campaign known to the public, publications or advertisements describing the campaign are distributed to potential customers. The publications include advertising materials such as text, graphics, animations, or other media describing the relevant products and the coupon details. The publications may be distributed in newspapers, magazines, on television, or over the Internet, for example. Any medium that allows for a customer to review and retrieve information about the coupon campaign may be used. Specific machine-readable coupon data is encoded within the publications to allow customers to load the coupons into various electronic devices. The coupon data may be encoded using text, bar codes or other machine-readable formats, for example. Generally, the information encoded within the publication provides enough data for a device to read the information from the publication and communicate with engine 12 to retrieve a valid coupon ID from the coupon campaign. After retrieving the coupon ID from engine 12, the customer can interact with POS system 20 to redeem the coupon and generate a discount. Other encoding mechanisms include the use of RFID tags, or serial numbers printed on the publication, for example.

Using the information encoded within the publication, a customer can use cell phone 18 to communicate with CIS 34 of engine 12 to retrieve and activate a specific coupon. Generally, this requires that cell phone 18 communicate with CIS 34 to retrieve the specific coupon ID from engine 12, however in some cases, the publication includes a coupon ID directly encoded within the bar code, or other encoding mechanism. If the coupon ID is encoded directly into the publication, the coupon provided by the publication can only be used once, as that particular coupon ID can only be used a single time. In other words, if the publication includes the coupon ID directly, only the first user to scan the publication will receive a valid coupon. Users who subsequently scan the publication in an attempt to load the coupon will be informed that the coupon is no longer valid as it has already been scanned.

Figure 4:
FIG. 4 illustrates a standard universal product code (UPC) bar code design that may be used to encode coupon data in a machine-readable format within a publication for a particular coupon campaign.

FIG. 4 illustrates a bar code design that may be used to encode coupon data in a machine-readable format within a publication for a particular coupon campaign. The bar code includes a company code which identifies the entity issuing the coupon campaign. A family code and a value code describe the product family to which the coupon relates and a discount value of the coupon. By printing the bar code within a publication or advertisement, a potential customer can review the publication or advertisement describing the coupon and associated products. If the customer wishes to use the coupon, the customer uses a personal electronic device such as a cell phone or PDA to scan the bar code included within the publication. After retrieving the information encoded within the bar code, the cell phone communicates with engine 12 (specifically CIS 34 of engine 12) to retrieve a valid coupon ID and other coupon data that can then be used at POS system 20 to make a purchase.

Figures 5, 6:
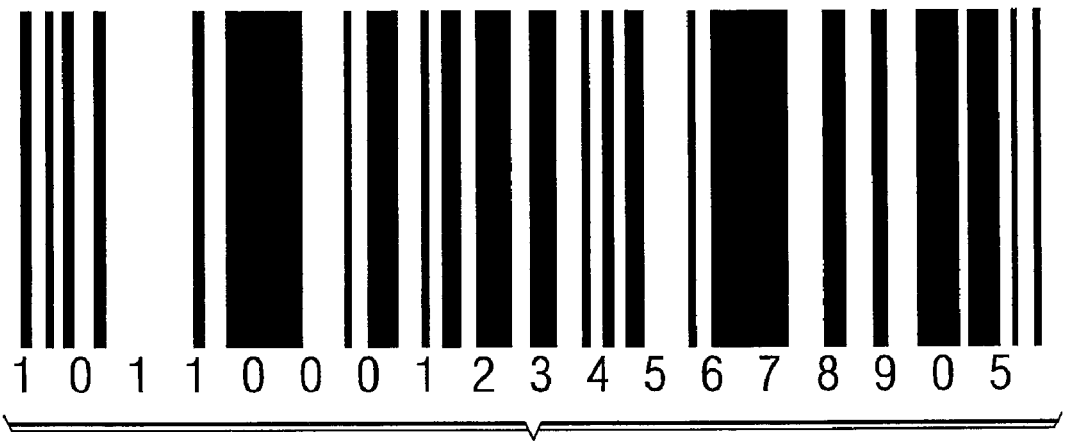
FIG. 5 illustrates an Electronic Product Code (EPC) data structure for representing a coupon ID using a 96-bit serial number.
FIG. 6 illustrates a GS1 DataBar format for a bar code for encoding coupon data with a publication.

FIG. 5 illustrates an Electronic Product Code (EPC) data structure for representing a coupon ID using a 96-bit serial number. In many cases, the EPC format is becoming a standard in RFID-based supply chain infrastructures. Using the EPC format to identify particular coupons within a campaign, a single coupon campaign can include over 68 billion unique and non-duplicable coupon IDs due to the 36-bit encrypted coupon serial number that may be assigned to each coupon.

A 3-byte product ID is illustrated in the EPC format including the family code and the value code to provide assurances that a purchased item matches the presented coupon to be redeemed. The encapsulated data within the product ID allows a validation mechanism located within the POS software to perform preliminary validation of the coupon against the purchased items before sending the coupon data to CPS 36 of engine 12 for clearing and settlement. In some cases, a 4-bit reserved for future use (RFU) flag may be included within the bar code to extend the value code, and potentially provide a 3-digit value similar to its GS1 DataBar counterpart.

In the present embodiment, the expiration date of the coupon is not necessarily included within the encoded data, or within any plain-text information included within the publication. Expiration dates do not need to be included within the publication as no expired coupons will be presented to POS system 20 because cell phone 18 of customer 16 tracks the expiration dates of the coupons when determining which coupons to present to POS system 20. Accordingly, cell phone 18 prevents attempted use of expired coupons.

In the EPC-based formatting illustrated in FIG. 5, the manufacturer ID is used to identify the corresponding CIS 34 that has issued the coupon campaign. The manufacturer ID and the product ID are both in plain-text format while the coupon ID or item serial number may be encrypted with a random cryptographic key (indicated by dK on FIG. 5) provided by CIS 34 of engine 12. Depending upon the application, the cryptographic key may be a symmetric key (3-DES, or AES-based keys, for example) derived from a master key stored in HSM 32 maintained by the issuing CIS 34 of engine 12. In another embodiment, a Message Authentication Code (MAC) using ISO9797-1 MAC algorithm 3 with method 2 may be appended to the EPC bar code to ensure data integrity.

By encrypting the coupon ID using a key known only to CIS 34 of engine 12, neither the customer, nor the merchant that issued the coupon campaign, nor the assigned CPS 36 will be able to see a coupon ID in plain text and thus cannot forge one as it doesn't know the associated cryptographic key. This configuration prevents both consumer and retailer fraud and man-in-the-middle counterfeits as the encryption key must be known in order to generate a valid coupon ID. Without the key, it is difficult or impossible to generate a counterfeit coupon ID.

In a further alternative embodiment, the GS1 DataBar (illustrated in FIG. 6) may be used as a bar code design within a publication to encode information identifying a coupon or coupon campaign. Alternatively, the EPC data structure described above may be further modified using specific tags to embed GS1 DataBar formatted mobile coupons or any other formats.

Figure 7:
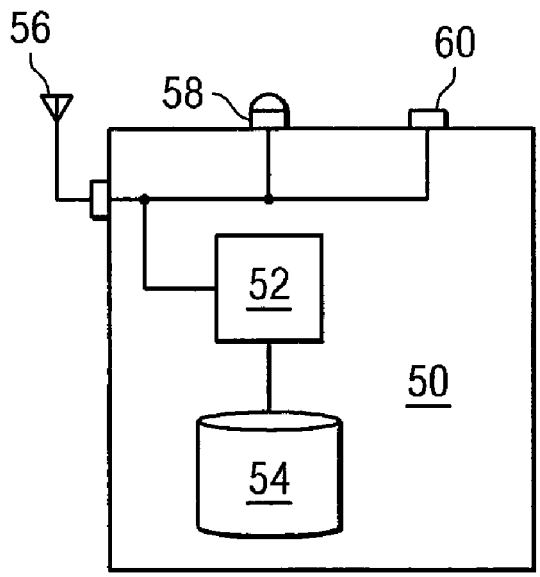
FIG. 7 illustrates the components of a personal electronic device that is used by a customer to load, manage, and use coupons when making purchases.

FIG. 7 illustrates the components of personal electronic device 50 that is used by a customer to load, manage, and use coupons when making purchases. Personal electronic device 50 includes any electronic device capable of retrieving coupon data encoded in a machine-readable format, managing coupons, and communicating with POS system 20 to transfer coupon information for redemption and processing. Personal electronic device 50 may include cell phones, PDAs, music players, cameras, or other computer devices.

Personal electronic device 50 includes processor 52 for executing software code and processing requests for coupon data. Processor 52 executes a wallet software application for managing the coupon data. The wallet software provides a user interface that allows a customer to initiate retrieval or deletion of coupons, check the status of coupons, review a library of activated coupons, or to initiate the coupon redemption and processing process. The wallet software application may be a JAVA ME application using the JSR 177 and JSR 275 specifications. It may also be a SYMBIAN, BREW, WINDOWS MOBILE or other mobile client application. For example, the wallet software application may include a Java Card MIDlet.

Processor 52 is connected to data storage system 54 located within personal electronic device 50. Storage system 54 may include a smart card-hosted coupon manager. In other embodiments, data storage 54 includes flash memory drives, external hard drives, solid state drives, SmartMedia cards, Memory Sticks, and miniSD or microSD memory cards. The coupon manager interacts directly with storage system 54 to manage the coupons by adding or removing coupons or marking coupons as redeemed, expired, or active. In one embodiment, the coupon manager is implemented as a Java Card Applet. The wallet application is configured to interface with the coupon manager when loading or retrieving coupons and does not interface with data storage 54 directly. Accordingly, the coupon manager acts as a proxy between the wallet software and storage device 54. In one embodiment, the wallet application allows the user to activate and deactivate coupons over a contactless interface by providing a personal identification number (PIN) to the coupon manager.

When first using the wallet software to communicate with CIS 34 of engine 12, CIS 34 may trigger an over-the-air (OTA) installation of the wallet application and coupon manager on device 50 using a GlobalPlatform implementation. The installation process assigns a random encryption key to the particular instance of the coupon manager installed on cell phone 18 of customer 16. Accordingly, every installed version of the coupon manager has a unique identifier or encryption key which may operate as a unique ID or token for identifying customer 16. Alternatively, CIS 34 uses a unique identifier such as a mobile subscriber integrated services digital network number (MSISDN) or a primary account number (PAN) to operate as a unique ID or token to identify each installation of the coupon manager and identify customer data in databases 30. During communications with engine 12, the coupon manager on cell phone 18 is programmed to transmit the unique ID or token identifying the coupon manager and other information to CIS 34 when explicitly selected. The data may be referred to as the file control information (FCI). In one embodiment, the coupon manager will not add or remove coupons, unless it receives a communication from CIS 34 including the coupon manager's unique ID or token for authentication. Additional information included within the FCI may be the version number of the installed coupon manager which allows engine 12 to determine the program's available features in advance before a transaction is executed.

In an embodiment where the smart card is a UMTS Integrated Circuit Chip (UICC) within an NFC-enabled global system for mobile communications (GSM) station, mobile coupon IDs may be stored in secure files protected by PINs. If a file system application programming interface (API) is available, the coupon manager may use the API. Otherwise, for NFC-equipped code division multiple access (CDMA) phones with an embedded smart card, the coupon manager will emulate a file system accordingly. These secure files which are managed by the coupon manager could be organized as ISO 7816-Linear Record (LR) files. In another embodiment, storage device 54 may be managed by proprietary data structures (i.e., objects, primitive types) using Java card software.

Personal electronic device 50 includes interface 56 for communicating with engine 12. If personal electronic device 50 includes a cell phone, for example, interface 56 may be an antenna for implementing wireless communication with engine 12. In other embodiments, however, interface 56 includes any device configured to communicate with engine 12 such as wireless network interfaces, wired network interfaces, optical interfaces, or other electronic communication interfaces.

Personal electronic device 50 includes scanner device 58 for scanning machine-readable coupon information encoded within a coupon publication. Scanner device 58 may include an optical scanner for scanning text within the publication and performing OCR to retrieve coupon data. Alternatively, scanner 58 includes an optical scanner for scanning a 2D or 3D bar code printed on the publication. If the publication includes an RFID device, for example, scanner 58 includes a wireless interface for communicating with and reading information from the RFID device.

Personal electronic device 50 also includes POS interface 60 for communicating with POS system 20. POS interface 60 is configured to allow the coupon manager to transmit activated coupon data to POS system 20. In one embodiment, personal electronic device 50 communicates with POS system 20 using POS interface 60 and application protocol data unit (APDU) commands. Alternative proprietary instructions and parameters used in communicating with POS system 20 may include those defined by the ISO7816-based transaction protocol.

Figure 8:
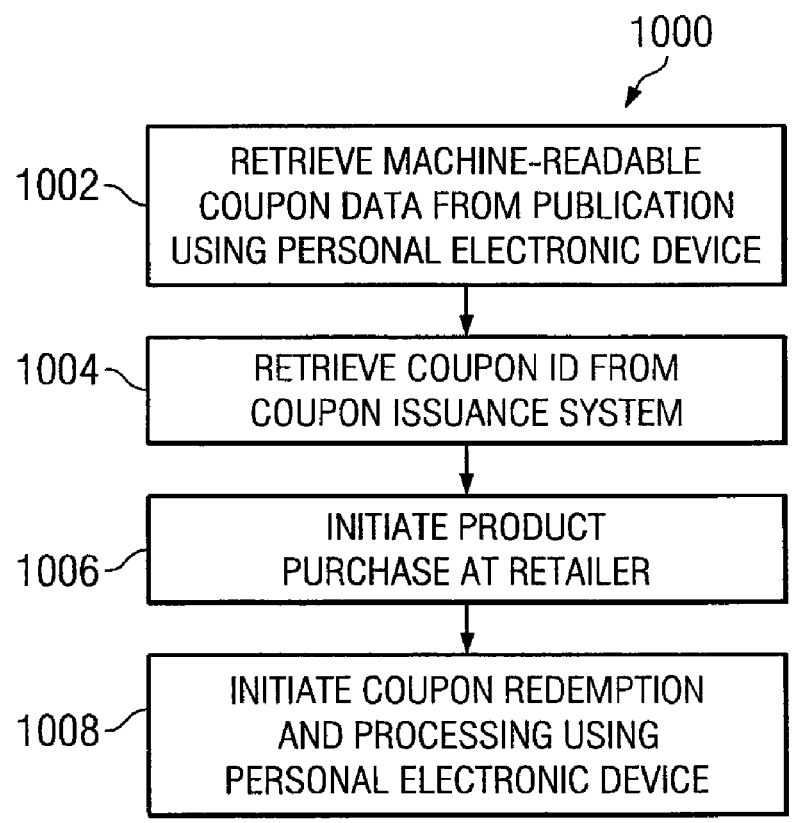
FIG. 8 illustrates an example method for retrieving and redeeming coupons from an engine and processing the coupons using the present system.

FIG. 8 illustrates example method 1000 for retrieving, redeeming and processing coupons using the present system. In step 1002 a customer uses wallet software on a personal electronic device such as a cell phone, digital camera, or other computer device to initiate a scan of a coupon publication such as a newspaper, smart poster, or billboard. The personal electronic device retrieves the machine-readable coupon data encoded within the publication using a scanner. The coupon data may be encoded using text, bar codes, RFID tags, or another machine-readable format. The coupon data retrieved from the publication includes data describing the coupon campaign and information which allows the personal electronic device to communicate with the CIS managing the campaign.

Using the coupon data, the electronic device communicates with the CIS in step 1004 to retrieve a specific coupon ID. The personal electronic device receives a specific coupon ID that identifies one of the coupons from the coupon campaign. The coupon ID and other information (including product family, and discount value) are stored in the storage system on the electronic device. To prevent fraud, the coupon ID is encrypted using an encryption key known only to the CIS. In one embodiment the encryption key is stored on HSM 32. The coupon is then marked as valid by the coupon manager. Depending upon the application, the user may need to enter a personal PIN or password to authorize the coupon manager to load the coupon into the device's storage system.

Figure 9:
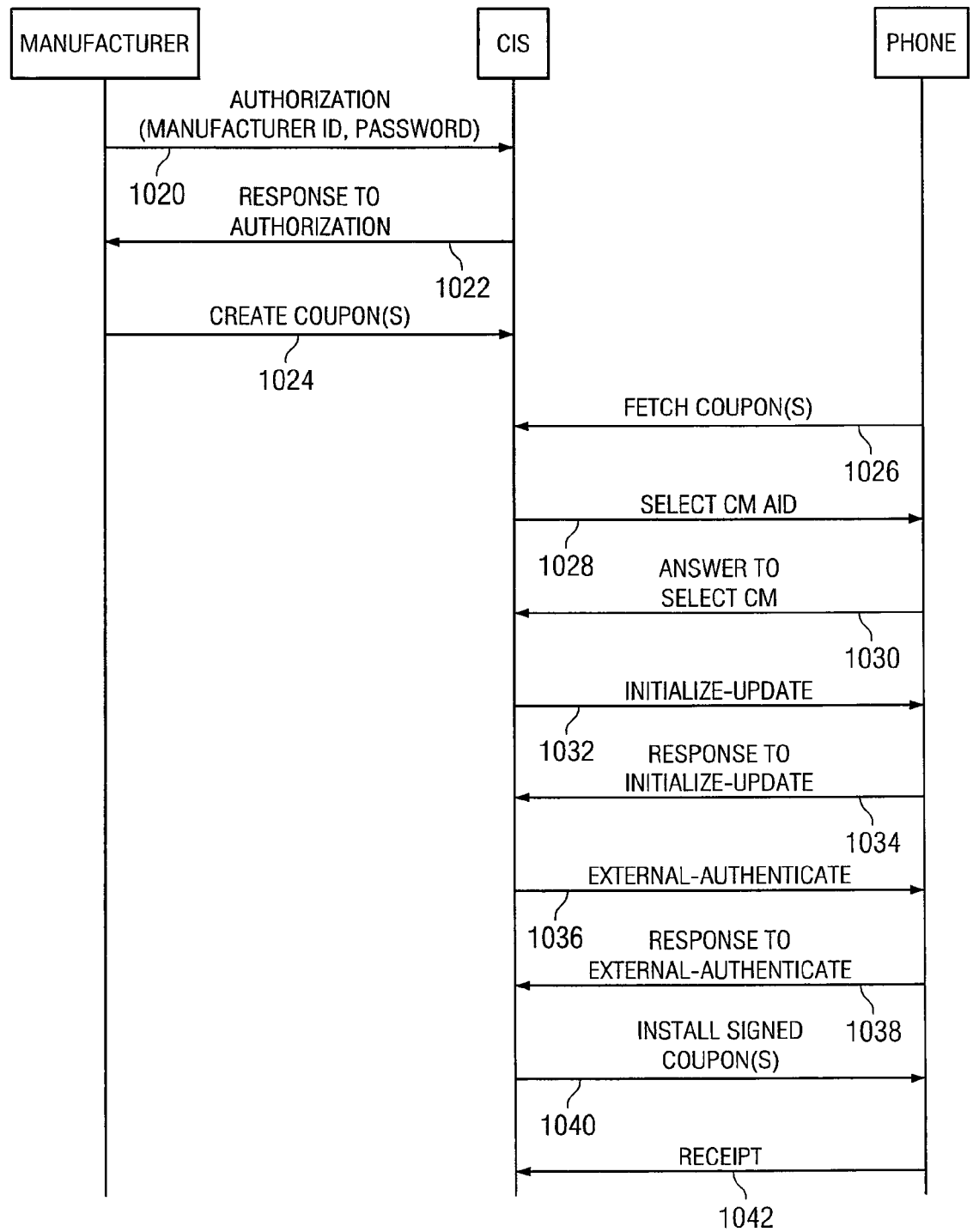
FIG. 9 illustrates an example process for communicating with an engine to create a coupon campaign and load a coupon into an electronic device.

FIG. 9 illustrates an example process for creating a coupon campaign and loading a coupon into an electronic device. In step 1020, a manufacturer or other entity transmits authentication information to the CIS to log into the system. After receiving the authentication information, the CIS transmits a response in step 1022 indicating to the manufacturer that it has successfully logged into the system. After logging in, the manufacturer submits campaign information to the CIS in order to create a series of coupons in step 1024. After the coupons have been created in step 1024, they can be retrieved by a customer using a personal electronic device.

In step 1026, after scanning coupon data from a publication, the personal electronic device transmits a coupon request to the CIS. Upon receiving the request, the CIS communicates with the electronic device to identify the device, update the device and authenticate the device. In step 1028, the CIS requests the unique ID or token of the coupon manager installed on the electronic device for identification. In step 1030, the electronic device transmits the requested information to the CIS. In step 1032, the CIS transmits any software updates or other system upgrades to the electronic device. Having received and installed any upgrades, the electronic device transmits a response to the upgrade in step 1034. The response may include an indication of whether the upgrade was successful or any problems associated with the upgrade. In step 1036, the CIS requests authentication information from the electronic device. The electronic device transmits authentication information to the CIS in step 1038. After authentication, the CIS transmits the coupon data to the electronic device in step 1040. The coupon data may include an encrypted coupon ID, or other signature information to verify the integrity of the coupon data, or to ensure that the coupon data was issued by the CIS rather than another entity. Finally, in response to the coupon data, the electronic device transmits a receipt to the CIS in step 1042 to acknowledge receipt and successful installation of the coupon.

Returning to FIG. 8, in step 1006, after retrieving coupons from the CIS, a customer initiates a purchase of goods or services at a retailer or other merchant. To initiate the purchase, the customer collects items to be purchased and goes through the checkout process. The POS system at checkout scans all of the items to determine a product price and product family for each item.

In step 1008, the customer uses the electronic device to initiate coupon redemption. Depending upon the system, the POS system may retrieve coupons from the electronic device using a contactless interface such as an NFC communication interface operating at approximately 13.56 megahertz (MHz), however other data communication interfaces such as wired or optical communication interfaces may be used. After initiating coupon redemption, the coupon manager of the personal electronic device retrieves valid and/or activated coupons from the device's storage system and transmits them to the POS system. In one embodiment, the coupon manager communicates with the POS system using APDU commands. For example, a series of proprietary instructions and/or parameters may be defined using the ISO7816-based transaction protocol.

Figure 10:
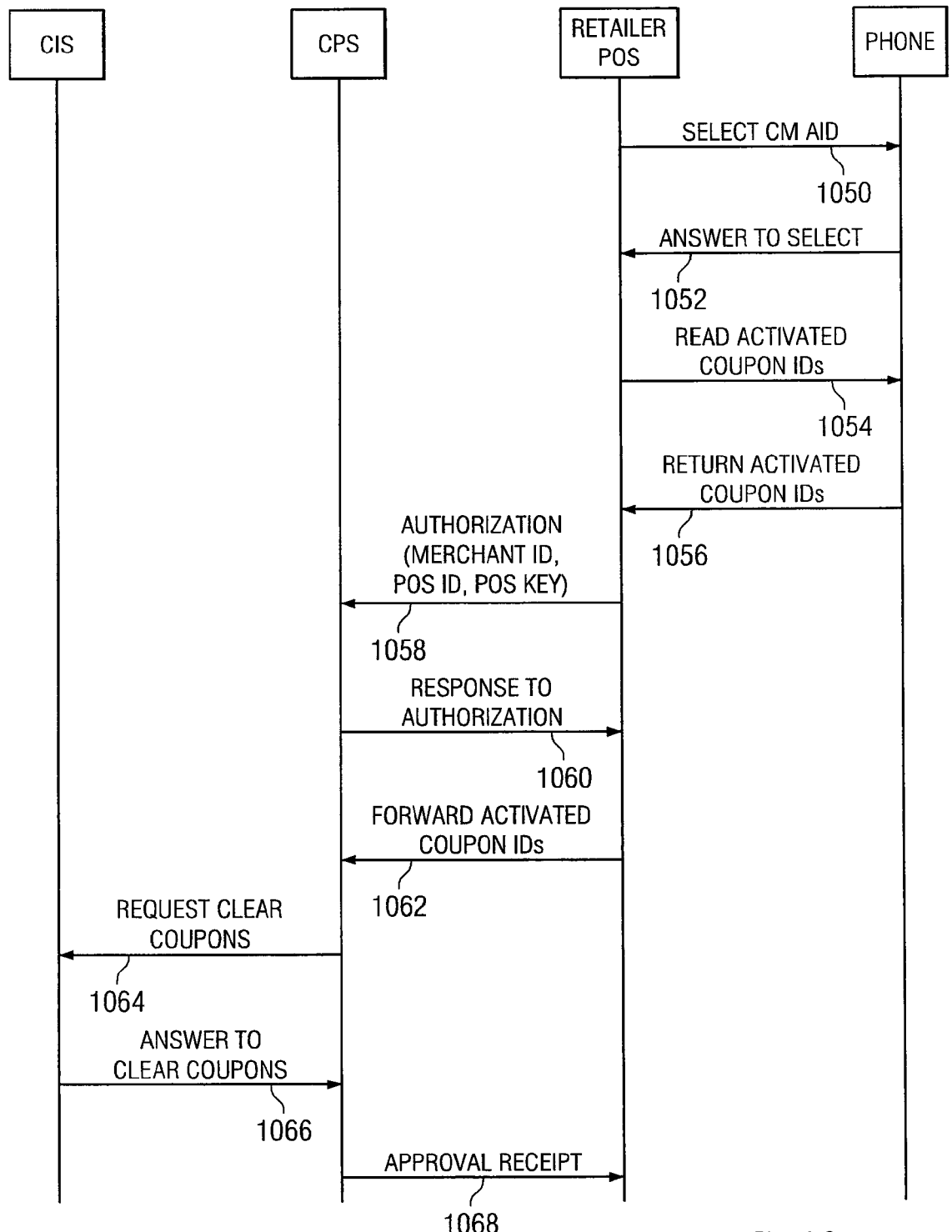
FIG. 10 illustrates an example process for a point of sale (POS) system to retrieve a listing of coupons from a customer's electronic device and to process those coupons to discount the total amount of the customer's transaction.

FIG. 10 illustrates an example process for a POS system to retrieve a listing of coupons from a customer's electronic device and to process those coupons to discount the total amount of the customer's transaction. The process includes the steps that are executed when the customer presents a mobile phone or other electronic device storing coupon data to the POS system to redeem the coupons.

As shown in FIG. 10, in step 1050 of the redemption process the POS system issues an ISO 7816-4 select command to the publicly known (ISO 7816-5 registered) coupon manager running on the customer's cell phone to initiate communication with the device. The select command may include the coupon manager's application ID (AID) as a parameter, facilitating communication between the coupon manager and the POS system. In one embodiment, the AID serves as an publicly-known ID to distinguish the coupon manager from other software applications running on the customer's cell phone.

In step 1052, in response to the original select command, the coupon manager on the cell phone returns a data packet to the POS system indicating successful receipt of the select command. The data packet also indicates to the POS system that a successful communication channel has been established. In one embodiment, the coupon manager returns a packet including a status in its response APDU to confirm the success of the selection command. The return packet may include an additional payload (such as a 253 byte payload) that contains additional information describing the coupon manager such as the FCI.

Having received a successful return data packet from the coupon manager via the cell phone, the POS system sends a read activated APDU command in step 1054. The command causes the coupon manager to retrieve a listing of activated coupons stored on the cell phone and begin transmitting the coupon data and encrypted coupon IDs to the POS system in step 1056. The read activated command may include one or more parameters which indicate to the coupon manager the current coupon records being read by the POS system.

In one embodiment, the response APDU data containing the activated coupon data is formatted using Tag Length Value (TLV) structures. Due to the TLV data composition, an example response data field of 253 bytes would contain approximately 16 EPC-formatted coupon IDs. In the response APDU, the coupon manager uses a SW2 field to indicate whether more redeemable coupons are available. A non-zero value in this field indicates the next redeemable coupon set.

After receiving the coupon data, the POS system stores the list of encrypted coupon IDs to be approved for redemption and processing via the CPS. Depending upon the system configuration, the CPS may operate as an EPC Manager maintaining a Global Registry (e.g., EPC Global Registry) database to lookup each issued coupon's CIS info and associated routing data. For example, if multiple CIS systems exist, the CPS may include a lookup table containing contact information for each CIS. Upon receiving data for a specific coupon, the CPS can use the coupon data to find the specific CIS that issued the coupon.

In this configuration, EPC global assigns a unique identifier to each EPC Manager, and the CPS hosting entity may also be registered with EPC global provided the CPS and the CIS are not maintained by separate entities, or otherwise decoupled. Otherwise, only the central CIS would be the publicly registered entity allowing coupon issuers to use its public ID. In this case, the CIS central database would be used to route the coupon transaction to each issuing coupon entity hosting an instance of the CIS.

Furthermore, in this configuration VERISIGN, INC. may operate the Object Naming Service (ONS) root directory in the EPCglobal network. In that case the central CIS communicating with the CPS or a plurality of CPS hosting entities operates a private or local ONS for other coupon issuers hosting their own CIS module.

Having received the coupon data in steps 1054 and 1056, the POS system analyzes the family code of each coupon to determine whether the coupon is relevant to any of the products being purchased (alternatively, this comparison may be performed by the CPS if it has access to a list of product currently being purchased by the customer). After determining the coupons that are to be redeemed and processed in the present transaction, the POS system begins communication with its authorized CPS.

To initiate communication, the POS system transmits its credentials and any identifying information to authenticate the POS system with the CPS in step 1058. After authentication, the CPS identifies the POS in step 1060 and a secure channel between the CPS and the POS system is created to allow coupon data to be exchanged in the form of cryptograms using a random session key known by each party.

After the secure channel is created in step 1060, in step 1062 the POS system forwards to the CPS the encrypted coupon IDs that were retrieved from the mobile phone and identified as being relevant to the products being purchased.

After receiving the encrypted coupon IDs, the CPS decrypts the coupon data using an encryption key stored on database 30 of engine 12, or on HSM 32 and transmits the plaintext coupon IDs to the central CIS to authorize redemption of each of the coupons in step 1064. Throughout this process, the CPS and the CIS both maintain audit trails in their accessible databases.

In configurations where the CIS and CPS are not operated by the same entity and are therefore decoupled, the CPS does not have access to the encryption keys that were originally used to encrypt the coupon IDs. In that case, the CPS cannot decrypt the coupon data received from the POS system and must transmit the encrypted information to the CIS for validation and redemption and processing. In one embodiment, the encrypted data may be encoded using Extensible Markup Language (XML). Alternatively, the CPS may encode the encrypted coupon data using an exchange protocol such as a variant or extension of the Physical Markup Language (PML) initially proposed in the EPC network standards. Alternatively, the CPS may use ISO 8583-formatted messages for communicating with both the remote CIS and/or the POS system. The following XML message illustrates an example format for communicating encrypted coupon data between components of the present system:

```
<Coupons>
    <tx:DateTime>2007-12-02T13:04:34-06:00</tx:DateTime>
    <pos><ID>125</ID></pos>
    <cm><FCI>60300B15205555555</FCI></cm>
    <cpn>
        <uid>urn:epc:1:2.24.400</uid >
    </ cpn>
    < cpn >
        <uid>urn:epc:1:2.24.401</uid>
    </ cpn>
</Coupons>
```

After receiving either plaintext or encrypted coupon data, the central CIS reviews the coupon data to determine whether the coupons are valid. For example, the CIS decrypts the coupon IDs and verifies that the coupon IDs belong to existing coupon campaigns and that the coupon IDs have not already been redeemed by other customers and are still valid. After verifying that the coupon IDs are valid, the CIS returns an authorization receipt to the CPS in step 1066. At this time, the CIS updates the system database to indicate that the coupon IDs have been used thereby preventing other customers from using the same coupons IDs to get discounts.

After receiving authorization to use the coupons from the CIS, the CPS forwards the authorization to the POS system in step 1068. After receiving the authorization, the POS system applies the discounts included in each coupon and executes the transaction for goods. In one embodiment, the customer's cell phone includes a payment system that allows for payment for the goods through the same communication interface that was used by the POS system to retrieve the coupon data. In other embodiments, however, payment can be submitted using other systems such as cash, credit cards, or other electronic forms of payments. Depending upon the system configuration, the coupon validation and processing steps will take approximately two seconds.

By deferring redemption and processing of coupons until a card payment transaction is approved, the system avoids undertaking unnecessary chargeback activities to the retailer if the coupons are never redeemed, ultimately determined to be invalid, or if the transaction is cancelled or never completed.

After the transaction is complete, the POS system may initiate a request for reimbursement of the face values of the redeemed coupons by communicating with the CIS through the CPS. The reimbursement requests may be issued after each transaction, or may be accumulated over a period of time and submitted in the form of batch requests containing coupon data for many different customer transactions. Depending upon the agreed payment options, the central CIS may make an electronic funds transfer to the merchant's acquiring bank account through the central CPS. The payment instructions could include credit card information, a PayPal account, an IBAN code or a SWIFT code, for example. Depending upon the system configuration, the CPS may interface with a payment processor or include payment processing capabilities to execute the transfer of funds.

With the goods paid for and the transaction complete, the coupon manager within the customer's cell phone marks the used coupon IDs as redeemed. Accordingly, those coupons will not be made available by the coupon manager at the next transaction. At the next transaction, after receiving a request for activated coupons from the wallet software, the coupon manager indicates that the coupons are redeemed and may not be used. After receiving the notification that certain coupons have been redeemed, the wallet software may display to the user that the coupons have been redeemed and are no longer available. The coupon manager prevents the customers from changing the status of the redeemed coupons, but the customers can use the wallet software to initiate deletion of the redeemed coupons via the coupon manager.

For security reasons, during a transaction, an offline PIN may be entered by the customer into the POS system to permit it to communicate with the coupon manager on the customer's cell phone. The PIN allows the POS system to send commands to the customer's cell phone for changing the status of coupons e.g., from deactivated to activated status. The PIN may be also used when the POS is in an offline context in order to deduct the values of activated coupons.

In one embodiment, the coupon distribution, redemption and processing system is configured to control an allowed number of coupons distributed per cell phone. This control may be implemented by the CIS, CPS, wallet software or coupon manager. By controlling the distribution number of coupons per cell phone, a malicious retailer is required to use a large number of cell phones in order to redeem a large number of coupons. As the cost per mobile phone doesn't justify the fraud for relatively low-value coupons per handset, this constraint reduces the potential of retailer frauds. As recommended, the CPS shall also maintain an audit trail containing at least the date, time, pos ID, MSISDN or PAN of the processed mobile coupons.

FIG. 11 illustrates pseudo-code providing an alternative process for retrieving and redeeming coupons using the present system. The pseudo-code summarizes the intended redemption and processing protocol whereby the CPS also acts as a payment processing entity by connecting to a plurality of payment card networks. The pseudo-code illustrates a process for redeeming coupons and making a payment using the Europay Mastercard Visa (EMV) contactless protocol. In the process, payment card information is retrieved using the EMV contactless protocol initiated by selecting the Proximity Payment System Environment (PPSE).

While one or more embodiments of the present invention have been illustrated in detail, the skilled artisan will appreciate that modifications and adaptations to those embodiments may be made without departing from the scope of the present invention as set forth in the following claims.

What is claimed:

1. A computer-implemented method of executing a transaction using an electronic coupon, comprising:
   providing coupon campaign information to an engine, the coupon campaign information defining a discount value, a product family and a number of coupons to be distributed, each coupon within the coupon campaign having a coupon identification (ID);
   providing coupon publications including a machine-readable portion, the machine-readable portion encoding coupon data describing the coupon campaign information;
   retrieving the coupon data from the machine-readable portion of the coupon publication using a personal electronic device;
   using the coupon data to retrieve a coupon ID from the engine, the coupon ID being stored in the personal electronic device;
   using near-field communications (NFC) to transmit the coupon ID to a point of sale (POS) system using the personal electronic device, the personal electronic device being one of an NFC-enabled global system for mobile communications (GSM) station and an NFC-enabled code division multiple access (CDMA) phone, the personal electronic device operating a Java Card Applet for coupon management and a Java MIDlet for user interfacing, the POS system communicating with the engine to verify a validity of the coupon ID;
   applying a discount to a transaction in accordance with the discount value; and
   after the transaction is complete, modifying the coupon data on the personal electronic device to indicate a coupon associated with the coupon ID has been activated.

2. The computer-implemented method of claim 1, wherein the coupon ID is encrypted by the engine using an encryption key.

3. The computer-implemented method of claim 2, wherein the encryption key is stored on a hardware security module (HSM) in communication with the engine.

4. The computer-implemented method of claim 1, wherein applying a discount to a transaction in accordance with the discount value includes comparing the product family of the coupon campaign information to a product family of a product included in the transaction.

5. The computer-implemented method of claim 4, including executing a financial exchange between a manufacturer of the product and a retailer executing the transaction to compensate the retailer for the value of the discount.

6. The computer-implemented method of claim 1, wherein the coupon ID is represented using an Electronic Product Code (EPC) format including a 96-bit serial number.

7. A method of executing a transaction using an electronic coupon, comprising:
   communicating with an engine using a personal electronic device to execute a coupon search, the engine storing coupon campaign information, the coupon campaign information defining a discount value, and a product family, each coupon within the coupon campaign having a coupon identification (ID);

selecting a coupon from a list of search results generated by the coupon search to retrieve coupon data from the engine, the coupon data including a coupon ID and being stored in the personal electronic device;

using near-field communications (NFC) to transmit the coupon data to a point of sale (POS) system using the personal electronic device to initiate a transaction, the personal electronic device being one of an NFC-enabled global system for mobile communications (GSM) station and an NFC-enabled code division multiple access (CDMA) phone, the personal electronic device operating a Java Card Applet for coupon management and a Java MIDlet for user interfacing, the POS system communicating with the engine to verify a validity of the coupon ID;

entering a personal identification number (PIN) into the POS to authorize the POS to modify the coupon data stored on the personal electronic device; and after the transaction is complete, receiving an instruction from the POS to modify a status of the coupon data.

8. The method of claim 7, wherein the personal electronic device includes a cell phone.

9. The method of claim 7, wherein the coupon ID is represented using an Electronic Product Code (EPC) format including a 96-bit serial number.

10. A computer program storage medium usable with a programmable computer processor and having a computer readable program code embodied therein, comprising:

computer readable program code which retrieves coupon data from a machine-readable portion of a coupon publication, the machine-readable portion of the coupon publication encoding coupon data describing coupon campaign information, the coupon campaign information defining a discount value, and a product family, each coupon within the coupon campaign having a coupon identification (ID);

computer readable program code which communicates with an engine to verify a validity of the coupon data;

computer readable program code which uses near-field communications (NFC) to transmit the coupon data to a point of sale (POS) system to initiate a transaction using a personal electronic device, the personal electronic device being one of an NFC-enabled global system for mobile communications (GSM) station and an NFC-enabled code division multiple access (CDMA) phone, the personal electronic device operating a Java Card Applet for coupon management and a Java MIDlet for user interfacing, the POS system communicating with the engine to verify a validity of the coupon ID; and computer readable program code which, after the transaction is complete, receives an instruction from the POS to modify a status of the coupon data.

11. The computer program storage medium of claim 10, including computer readable program code which compares the product family of the coupon campaign information to a product family of a product included in the transaction.

* * * * *